(12) United States Patent
Campana

(10) Patent No.: US 6,255,612 B1
(45) Date of Patent: Jul. 3, 2001

(54) CONTROL ELEMENT FOR FASTENING TO A FRONT PANEL

(75) Inventor: Urs Campana, Zwingen (CH)

(73) Assignee: TH Contact AG, Reinach (CH)

( * ) Notice: Subject to any disclaimer, the term of this patent is extended or adjusted under 35 U.S.C. 154(b) by 0 days.

(21) Appl. No.: 09/569,070

(22) Filed: May 11, 2000

(30) Foreign Application Priority Data

May 12, 1999 (CH) ..................................................... 913/99

(51) Int. Cl.[7] .................................................. H01H 9/02
(52) U.S. Cl. .......................................... 200/520; 200/296
(58) Field of Search ............................... 200/17 R, 520, 200/293–296, 302.1–302.3, 307, 329, 336, 339, 341; 361/679, 724, 728, 752, 760, 807, 829, 832, 837

(56) References Cited

U.S. PATENT DOCUMENTS

| | | | |
|---|---|---|---|
| 4,016,359 | 4/1977 | Gamble . | |
| 4,035,597 | * 7/1977 | Josemans | 200/296 |
| 4,070,559 | 1/1978 | Piber | 200/296 |
| 4,156,804 | * 5/1979 | Piber | 200/296 |
| 4,306,123 | * 12/1981 | Taylor | 200/16 A |
| 4,354,074 | * 10/1982 | Aurand et al. | 200/153 J |
| 5,201,408 | * 4/1993 | Torma et al. | 200/294 |
| 5,541,377 | * 7/1996 | Stuhlmacher | 200/296 |

FOREIGN PATENT DOCUMENTS 33 13 145 A1   10/1984 (DE) .............................. E04F/19/08

* cited by examiner

Primary Examiner—Michael Friedhofer
(74) Attorney, Agent, or Firm—Collen Law Associates P.C.; Robert M. McDermott

(57) ABSTRACT

The control element according to the invention which for example can be in the form of a pushbutton switch or display element, is intended to be fastened to a front panel having at least one circular opening. It has a housing with an essentially cylindrical section and, at its front, a collar projecting radially outward and beyond the cylindrical section. The cylindrical section is provided with at least one all-around groove in which a ring of an elastically deformable material is present. When the control element is inserted into the front panel, it is fixed into the opening by virtue of the fact that a support surface of the collar rests on the front plate on the one hand and by the ring being pressed against the lateral surface of the groove by the lower edge of the opening on the other hand.

5 Claims, 1 Drawing Sheet

CONTROL ELEMENT FOR FASTENING TO A FRONT PANEL

BACKGROUND OF THE INVENTION

Figure 1:
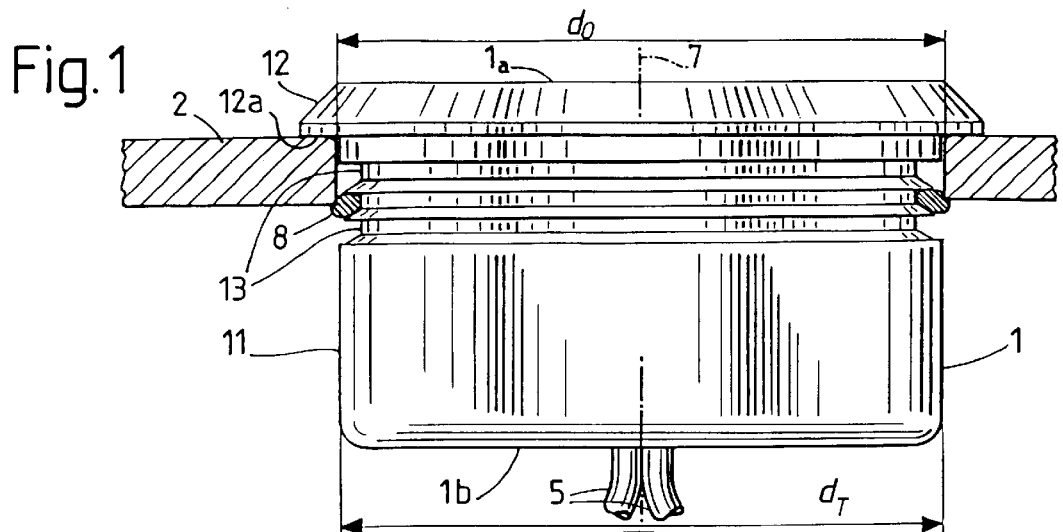

Conventional control panels having control elements, for example having pushbutton switches or display elements in house doorbells, transport means, elevators, etc., envisage that one or more control elements are fastened to a front panel or introduced into said panel and the latter in turn can be fastened in the desired place. In the installation of such control panels, the control elements are fastened to the front panel in a first step, which can be effected, for example, by means of a screw nut which is screwed onto a thread provided on the control element. The front panel as a whole is then fastened. However, such a procedure does of course require that the front panel be prefabricated as a separate workpiece. The installation, too, can be inconvenient and tedious depending on the cabling of the control elements and depending on accessibility of the control panel. Moreover, the front panel must be detached as a whole if a control element is faulty.

It would therefore be desirable to be able to fasten a control element directly to an already installed front panel. Such a front panel then need not be a separate, prefabricated workpiece. It would also be entirely possible for the casing provided with suitable openings, the housing or the like of the article on which the control panel is to be mounted also to serve directly as the front panel. In this way, high costs both for the production of the control panel and for its installation would of course be saved. A known means for permitting the fastening of a control element to a front panel installed in a fixed position consists in providing the front panel with additional holes into which, for example, plastics arms provided with a sawtooth profile and mounted on the control element can be introduced, which arms then fix the control element to the front panel. An other solution is disclosed in the two U.S. Pat. Nos. 4,070,559 and 4,016,359. These two publications each disclose a control element which can be formed, for example, as a switch or lever or as an electrical insulator and can be fastened to a front panel with a circular opening. In these known cases, the control element has a housing with a cylindrical section and an annular groove running all round the cylindrical section. The cylindrical section is dimensioned so that it fits virtually without play into the circular opening. These known control elements furthermore each have an annular spiral spring which fits into the annular groove and serves for fastening the control element without additional fastening means, i.e. in the manner of a snap fastener, to the front panel. On insertion of the control element into said front panel, the spiral spring is pressed into the annular groove. It relaxes again in the inserted state and then rests against the inside of the front panel, with the result that the control element is fixed in the opening.

This known method of fastening has the disadvantage that the cylindrical section has to be dimensioned so exactly that it can be inserted into the opening of the front panel so that it fits tightly, i.e. without play, and that the control element is relatively expensive because the spiral spring has to be specially made for this purpose.

SUMMARY OF THE INVENTION

It is the object of the present invention to provide a control element which does not have the disadvantages of the known control elements, can be fastened in a simple manner to a front panel and furthermore is economical to produce.

This object is achieved by a control element having at least one circular opening with diameter $d_O$ and a thickness T constant in the vicinity of this opening. The control element has a housing which has a front, a back and an essentially cylindrical section located in between and having a diameter $d_T$, wherein $d_T$ is slightly less than $d_O$, the housing has, at the front, a collar projecting laterally beyond and radially away from the cylindrical section and having a support surface making an angle of 90° with the cylinder surface and intended for supporting the front panel, the cylindrical section has at least one groove running all around in a plane perpendicular to the cylinder axis and having a width d measured at its broadest point, for the distance a from the middle of a groove to the support surface, measured parallel to the cylinder axis, t−b/2 <a<t+b/2, a ring which comprises an elastically deformable material and whose external diameter is greater than $d_O$ is present in the groove, and the ring is dimensioned and arranged in such a way that, in the state when inserted in the front panel, the control element is fixed in the opening by virtue of the ring being pressed against the lateral surface of the groove by the lower edge of the opening.

The present invention has substantial advantages compared with the prior art. Thus, it has the advantage that the housing of the control element can be produced in a very simple and economical manner. For example, if it is metallic, it can be produced by turning in a single operation. The installation of a control panel provided with control elements according to the invention is also very simple, and the control elements need only be provided with the necessary electrical connections and then inserted by pressing into the opening provided for them. For example, the installation in poorly accessible places is thus simplified and also permitted or simplified especially when the back of the control panel is not accessible or scarcely accessible. However, because of the control element according to the invention, the front panel in particular need not be a separately produced adapter. It can readily be formed by the casing, the housing or the like of the article on which the control panel is to be mounted. Thus, depending on circumstances, the production of a control panel provided with control elements according to the invention can simply consist in drilling at least one circular opening of a standard size in a casing formed, for example, by a metal sheet and then fastening the control element by manipulation. Compared with the customary prior art, this procedure does of course constitute a substantial simplification and is thus associated with considerable cost savings.

DETAILED DESCRIPTION OF THE PREFERRED EMBODIMENT

Figure 2:
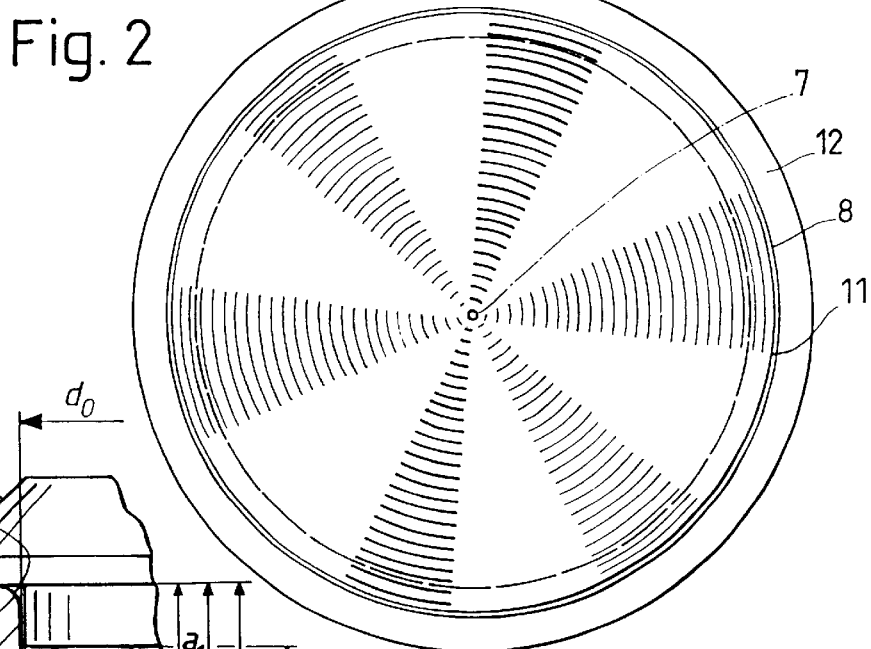
Figure 3:
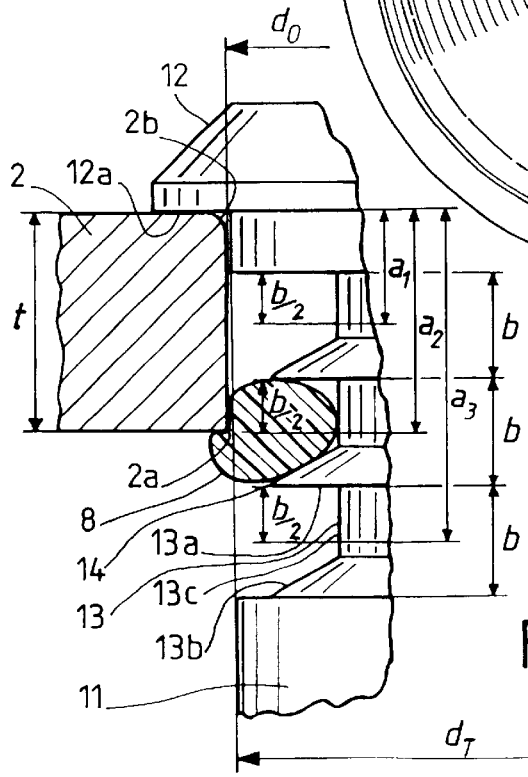

Below, an embodiment of the control element according to the invention is described with reference to a drawing. In the drawn and described example, the control element is in the form of a pushbutton switch. In the drawing, FIG. 1 shows a side view of the control element, whose ring is shown cut off and which is inserted into the front panel of a control panel, which front panel is likewise shown cut off, FIG. 2 shows a view of this control element from the rear, the electrical connection not being shown, and FIG. 3 shows an enlarged section of the view shown in FIG. 1.

The control element in the form of a pushbutton switch has a housing 1 with a front 1a and a back 1b. It is inserted into a circular opening having a diameter $d_0$ in the front panel 2 of a control panel, which front panel is, for example, part of the casing of the article on which the control panel is mounted. In the example shown, the thickness of the front panel in the vicinity of the control element is t=2 mm. A pushbutton switch actuation member not shown in the drawing is present in the interior of the housing 1. Said member can be actuated from the front 1a of the housing and has an actuation mechanism known per se; it may be in the form of, for example, a touch-sensitive sensor or a mechanically actuatable electric switch. The actuating member can transmit electrical switching pulses through leads 5 shown schematically here to a controlling device.

The housing 1 has an essentially cylindrical section 11 with an axis 7 and a diameter $d_T$ which is only slightly less than $d_0$ and is thus dimensioned so that the cylindrical section 11 can be pushed through the opening having the diameter $d_0$; for example $d_T$ is 0.3 mm less than $d_0$. A radially projecting collar 12 is adjacent to the cylindrical section 11 at the front of the housing 1a. This collar 12 has a support surface 12a which is at right angles to the lateral surface of the cylinder and is intended for resting on the front panel 2. In the example shown, the collar 12 is rotationally symmetrical with respect to the axis 7, but it may readily also be of another shape, for example rectangular. Furthermore, in the cylindrical section 11 in the example shown in the drawing, the housing 1 has three grooves 13 which run all around and are each in a plane perpendicular to the cylinder axis 7. The width b, measured at its broadest point, of each groove is, for example, 1 mm and its depth is, for example, 0.6 mm. In FIG. 3, the distances from the grooves to the support surface 12a, measured parallel to the cylinder axis 7, are denoted by $a_1$, $a_2$ and $a_3$; they are, for example, $a_1$=1.2 mm, $a_2$=2.2 mm and $a_3$=3.2 mm. The grooves are preferably shaped in such a way that, in a longitudinal section through the cylinder as shown, for example, in FIG. 3, they have two lateral surfaces 13a and 13b facing away from one another and a transition surface 13c connecting the lateral surfaces 13a, 13b to one another. The lateral surface 13a facing the front 1a of the control element is at right angles to the cylinder axis 7, whereas the lateral surface 13b facing the back 1b makes an angle of, for example, 40° to 80° with the cylinder axis 7. Because, in the embodiment shown, the grooves are a distance apart which corresponds to their width, the rear 13b and front 13a lateral surfaces of adjacent grooves 13 are contiguous with one another, an edge 14 being formed between them, so that, in the longitudinal section through the cylinder, a sawtooth profile results.

In one of the grooves, in the middle groove of the example shown, an essentially toroidal ring 8 of an elastically deformable plastic, for example a synthetic rubber or of silicone, is present. This ring 8 may readily be a commercially available gasket of a standard size. The diameter of the circular disk which forms if the ring 8 is cut at any point along a surface through the torus axis is preferably equal to the width of the groove. If the control element is now inserted into the front panel 2, the lower edge 2a of the circular opening in the front panel 2 presses on the ring 8 and deforms it. Because the ring rests against the lateral surface 13b and cannot escape from pressure by this edge 2a, it prevents the control element in FIGS. 1 and 3 from being pulled out upward and out of the opening in the front panel 2. In this way, the control element is firmly fixed in the opening as a result of the support surface 12a resting on the panel 2 on the one hand and said resting of ring 8 against the lower edge 2a on the other hand.

The distances from the middle of the grooves 13 to the support surface 12a are chosen so that they are less than half the groove width b larger or possibly smaller than the thicknesses of the front panels usually used. If the front panel in which the control element is to be inserted is clear from the outset, i.e. if, for example, control element and front panel form a unit as a result of a standard design or in another manner, it is of course sufficient to provide only a single groove 13 in the cylindrical section 11 of the housing 1.

Owing to the design according to the invention, the fastening of a control element to a front panel is very simple. In a first step, the control element must be provided with the necessary electrical connections. It is then pressed into the opening in the front panel 2 by pressure on the front 1a, the ring 8 being inserted into the groove 13 whose distance from the support surface 12a is only slightly greater than or possibly less than the thickness t of the front panel. A bevel 2b at the upper edge of the opening in the front panel 2 makes it possible for the ring to be deflected on insertion of the control element, with the result that this insertion can be effected with relatively little pressure. However, once the control element is present in the opening provided for it, it is firmly fixed and can be removed again only with application of considerable pressure and possibly with destruction of the ring 8. The difference between the force applied for insertion of the control element into the opening and that applied for removing said control element therefrom is particularly large if the groove 13 has the special shape described above and comprising the two asymmetric lateral surfaces 13a and 13b, since the ring can deviate from a force applied to it only in the direction of the housing front 1a but not in the direction of the housing back 1b.

At this point, it should also be mentioned that the control element described above is by no means the only possible embodiment for the invention but can also be modified in many respects. Thus, it is readily possible, for example, to dimension the sizes of the grooves 13 and of the ring 8 completely differently from those proposed above; for example, both may readily be twice as large as in the embodiment described above.

Of course, it is furthermore by no means necessary for the control element according to the invention to be in the form of a pushbutton switch. It can equally well be, for example, a display element or have another function.

The front panel, too, can be of a form different from that in the example shown. Thus, it need not necessarily be a part of the casing or of the housing of the article on which the control panel is to be fastened but, as in the case of customary control panels, may be an adapter which, for example, can be screwed on. Furthermore, it can be produced, for example, so that it has a countersink with the dimensions of the collar 12 in the vicinity of the opening, so that the control element is countersunk and its surface is, for example, flush with the surface of the front panel.

What is claimed is:
1. A control element that is intended for fastening to a front panel having at least one circular opening with a diameter $d_0$ and a thickness t constant in the vicinity of the at least one circular opening, the control element comprising
a housing which includes a front,
a back and
an essentially cylindrical section located in between the front and the back, having a diameter $d_T$, and wherein $d_T$ is slightly less than $d_0$, the housing has, at the front, a collar projecting laterally beyond and radially away from the cylindrical section and having a support surface making an angle of substantially 90° with the cylindrical section and is intended for supporting the front panel, the cylindrical section includes a groove, having a width b, in a plane perpendicular to an axis of the cylinder, such that, for a distance a from a middle of the groove to the support surface, measured parallel to the axis of the cylinder, $t-b/2<a<t+b/2$, a ring which comprises an elastically deformable material and whose external diameter is greater than $d_0$, the ring being dimensioned and arranged in the groove in such a way that, when inserted in the front panel, the control element is fixed in the at least one circular opening by virtue of the ring being pressed against a first lateral surface of the groove by a lower edge of the at least one circular opening, and wherein, in a longitudinal section through a plane passing through the axis of the cylinder, the groove includes a second lateral surface facing away from the first lateral surface and a transition surface contiguously connecting the first and second lateral surfaces the second lateral surface is substantially at right angles to the axis of the cylinder, and the first lateral surface makes an angle of 40° to 80° with the axis of the cylinder and is inclined so that a width of the groove decreases with increasing depth.

2. The control element as claimed in claim 1, wherein a depth of the groove, measured perpendicular to the axis of the cylinder, is between 45% and 100% of the width.

3. The control element as claim 1, further including a second groove having a width b and a distance $a_2$ to the support surface, measured parallel to the cylinder axis, so that it can be fastened alternatively to an other front panel having a thickness $t_2$ where $a_2-b/2<T_2<a_2+b/2$.

4. A control element that is intended for fastening to a front panel having at least one circular opening with a diameter $d_0$ and a thickness t constant in the vicinity of the at least one circular opening, the control element comprising
a housing which includes
a front,
a back and
an essentially cylindrical section located in between the front and the back, having a diameter $d_T$, and wherein $d_T$ is slightly less than $d_0$, the housing has, at the front, a collar projecting laterally beyond and radially away from the cylindrical section and having a support surface making an angle of substantially 90° with the cylindrical section and is intended for supporting the front panel, the cylindrical section includes:

at least two grooves, each having a width b, and each at a distance $a_1$ and $a_2$ to the support surface, respectively, measured parallel to the cylinder axis, so that the control element can be fastened to the front panel, if the front panel has one of either a first thickness $t_1$ where $a_1-b/2<t_1<a_1+b/2$ or a second thickness $t_2$ where $a_2-b/2<t_2<a_2+b/2$, and a ring which comprises an elastically deformable material and whose external diameter is greater than $d_0$, the ring being dimensioned and arranged in one of the at least two grooves in such a way that, when inserted in the front panel, the control element is fixed in the at least one circular opening by virtue of the ring being pressed against a first lateral surface of the one of the at least two grooves by a lower edge of the at least one circular opening.

5. The control element as claimed in claim 4, wherein a depth of each of the at least two grooves, measured perpendicular to the axis of the cylinder, is between 45% and 100% of the width.

* * * * *